United States Patent [19]

Kummermehr

[11] 4,394,337
[45] Jul. 19, 1983

[54] THERMAL INSULATING BODY AND A PROCESS FOR MAKING THE SAME

[75] Inventor: Hans Kummermehr, Ludwigshafen, Fed. Rep. of Germany

[73] Assignee: Grünzweig & Hartmann und Glasfaser AG, Ludwigshafen, Fed. Rep. of Germany

[21] Appl. No.: 196,171

[22] Filed: Oct. 14, 1980

[30] Foreign Application Priority Data

Oct. 13, 1979 [DE] Fed. Rep. of Germany ....... 2941606
Oct. 18, 1979 [DE] Fed. Rep. of Germany ....... 2942087

[51] Int. Cl.³ .......................... B29C 1/02; B29C 1/04
[52] U.S. Cl. .................................. 264/122; 264/347; 252/62
[58] Field of Search .................. 252/62; 264/109, 338, 264/25, 56, 62, 63, 71, 82, 106, 122, 347; 156/213, 62.3

[56] References Cited

U.S. PATENT DOCUMENTS

| | | | |
|---|---|---|---|
| 3,055,831 | 9/1962 | Barnett et al. | 252/62 |
| 3,344,094 | 9/1967 | Gaugue | 264/109 |
| 4,172,042 | 10/1979 | Kiisler et al. | 252/62 |
| 4,240,496 | 12/1980 | Gammal | 252/62 |

Primary Examiner—John E. Kittle
Assistant Examiner—John L. Goodrow
Attorney, Agent, or Firm—Oblon, Fisher, Spivak, McClelland & Maier

[57] ABSTRACT

A thermal insulating body or shape is made up of highly dispersed insulating material together with mineral fiber wool and of opacifier together with a binder for curing. The binder, which is evenly distributed in a first-stage mix with a dispersant, is present in a finely dispersed condition in the insulating material, the corners and edges of the insulating material being able to undergo cross-linking with the binder by heat processing.

13 Claims, 2 Drawing Figures

THERMAL INSULATING BODY AND A PROCESS FOR MAKING THE SAME

BACKGROUND OF THE INVENTION (i) Field to which the invention relates

The invention is with respect to a thermal insulation body made up of a highly dispersed insulating material with or without the addition of mineral fiber wool and opacifier, the insulating body having been cured by a binder.

(ii) The prior art

Known heat insulating bodies of this sort are, generally speaking, likely to undergo loss in form after compaction of the insulating material, because the composition of such a thermal insulating body is, more importantly, dependent on the interlocking and joining together of the finely dispersed particles. For normal handling, in the case of which careless working is likely to be the cause of heavy thrust and shearing forces, boards produced on these lines frequently do not have the desired properties and are readily broken.

For stopping breaking of such boards, when the boards are acted upon by heavy forces, a suggestion has been made in the past (see German Pat. No. 1,954,992) to make use of heat insulation boards in the case of which the particles of material or fibers are compacted and housed within a casing, the casing producing a force acting on the full inner face of the flexible casing, which generally has the form of a sack and is made up of a glass fiber-based or quartz fiber-based material. This inner pressure has the effect of acting oppositely to forces acting on the structure from the outside and which are produced by thrust or shearing effects, so that any fracture of the insulating body within the casing is stopped.

In a further earlier suggestion (see German Pat. No. 2,036,124) the highly dispersed insulating material cased within a sack, and forming therewith thermal insulating boards, was so interlocked with the case on compaction under pressure that a sandwiched structure made up of core material and casing was produced. This insulating material was marked by a high flexural or bending strength, this, however, being responsible for breaking of the board if acted upon by high flexural or shearing forces.

A somewhat different suggestion has been made in U.S. Pat. No. 3,055,831, which is with respect to readily-handled thermal insulating boards. These boards are made up of highly dispersed insulating material mixed with mineral fiber wool and opacifier in a very fine form. Addition takes place of a binder, which is mixed in, and then the mass is cured by heat or by a catalytic reaction. The particles of the binder have to be of the same order of size as the particles of the insulating material so that their grain size is under 0.1 micron. For producing such a grain size, the binder is processed in special-purpose mills, as for example vibratory or ball mills, to get to the right grain size and is then worked into the insulating material mixture with the help of a mixing apparatus, something which is, however, hard to undertake, because not only the fine-grain binder, but furthermore particles of insulating material become clumped at once on mixing as secondary agglomerates, this stopping the desired mixing of the binder and the insulating material. The outcome is an uneven distribution in the binder-insulating material mix, something which has its own undesired effects on the mechanical properties of the completed board. Because only certain, limited insulating material compound structures are kept together by the binder-agglomerate, there is a tendency for the product, after curing, to be broken when acted upon by forces so that, in this case as well, the desired properties are only produced to a limited degree.

The prior art thermal insulating board of German Offenlegungsschrift specification No. 2,748,307 is made up in its core of a mixture of pyrogenic silicic acid or silica, opacifiers and certain mineral fibers, the casing of this core being a layer of mineral fibers with fillers and inorganic binder. The relatively coarse grained fillers of the outer layer are cured with water glass as a binder, something responsible for further interlocking and part-dissolving of the silica within the second layer so that there is a further-going, intimate joining up of the two layers. This sort of processing with binder, however, only makes for a limited protection of the core of the thermal insulating board, becase the relatively coarse covering layer, even in the cured condition, is not specially resistant to rubbing and, for this reason, the mechanical strength of the board is not increased to the degree thought likely by the curing step.

SHORT OVERVIEW OF THE INVENTION

For this reason, one purpose of the invention is that of designing a thermal insulating body of the sort noted at the start that there is such an even and fine distribution of the binder that, after curing, a thermal insulating body with very high-level properties is produced.

This purpose, and further purposes are effected in the invention in that the binder, evenly distributed in a first-stage mix with a dispersant, is distributed, in a finely dispersed condition, in the insulating material, the edges and corners of the insulating material being able to be cross-linked with the binder by heat processing.

In the case of such a thermal insulating body, there is the useful effect that the desired thermal insulating and mechanical properties are united as a single structure, that is to say the thermal insulating body of the present invention has, in addition to a very high level of thermal insulating properties, a very high degree of resistance against breaking and is furthermore resistant to thrust and shear forces to the desired degree.

Because a binder is used, it is not necessary to make use of a casing for the insulating material so that, because such a casing is not present, there will be a decrease in material and labor needed. Furthermore, the core layer is now homogeneous, unlike earlier materials, this being because the insulating material is hookingly locked onto the fabric of the casing, so that, taking a general view, it may be said that the quality of the product is increased.

The useful properties of the heat insulating body of the present invention are produced because the binder particles, after fine grinding, are mixed with a dispersant for making up a first-stage mix, a clumping together of the binder particles being stopped with good effect by the addition of dispersant. The first-stage mix, in which the binder is in an evenly mixed condition, is then mixed into the insulating material, this producing a very fine distribution of the binder in the insulating material. On curing, the binder particles may undergo mutual reaction or cooperation with the insulating material particles next to them at the edges and corners thereof so that, with the same, a three-dimensionally locked and joined-up lattice is produced, such lattices giving the completed product a high degree of strength with respect to the effects of mechanical forces.

As binders, it is possible to make use of all inorganic or organic binders, which may be decreased to a size down to a level under 1 micron by grinding, and which become soft or melted under 700° C. so that they become compounded with the insulating material particles round them. The grinding of the binder particles down to a size of generally 1 micron or less is responsible for producing binder particles which, while having an even distribution in the insulating body, make certain of a high mechanical strength and stability. The upper temperature limit of about 700° C. is to be kept to because, at higher temperatures, sintering of the insulating material particles will be started, this being responsible for a loss in the thermal insulating properties of the insulating body.

Inorganic-based binders are, for example, low-melting point glasses, glass-forming materials, glass solders, phosphates, sulfates, carbonates, hydroxides or oxides of the alkali metals and alkaline earth metals, sodium silicates, borates, borax, sodium perborate and mixes thereof. More specially, soda or sodium sulfate is used, the addition being made of some fine-grained carbon black to the sodium sulfate for reducing it.

Examples for organic-based binders are phenol-formaldehyde synthetic resins, urea formaldehyde synthetic resins, thermoplastic resins such as PVC resins or copolymers of vinyl chloride and vinyl acetate, polyurethane granulates, polyamides, polyethylene, silicone synthetic resins and the like. More specially, formaldehyde resins or methylsilicone synthetic resins are used after a process of fine grinding.

Generally, the amount of the binder used is worked out in a way dependent on the desired stiffness and flexibility of the board or plate, the desired outcome generally being produced if, by the addition of the binder, the board is made resistant to abrasion. For this reason, the binder level is generally 2 to 30%, and more specially 10% of the weight of the insulating material.

For causing the most even distribution of the binder possible, and without any clumping together to take on the form of an agglomerate, in the insulating material, before being mixed into the insulating material, it is thoroughly or intimately mixed with a dispersant and then undergoes grinding down to a grain or particle size of 1 micron or less. On the other hand, the binder, after such fine grinding, may undergo such a fine distribution by mixing with the dispersant that there will be no signs of an agglomerate being formed.

As a dispersant, it is possible to make use of hydrophobized inorganic or organic substances, as for example hydrophobized and/or pyrogenic silica or polymers such as polytetrafluoroethylene, hydrophobized silica, however, being best because of its low price.

This dispersant, whose grain size may be even less than 1 micron, is thoroughly mixed with the fine-grained binder at a level of 0.5 to 20 and, more specially, 5 to 10% of the weight of the binder so as to take the form of a first-stage mix, which is then mixed with other materials of the thermal insulating body in a mixing apparatus till an even and a very fine distribution of the materials has been made certain of. The dispersant undertakes in this respect the function of a spacer for the other substances in the thermal insulating body so that the single binder particles will be present with an even distribution in the insulating compound without any signs of agglomerating. For this reason, the dispersant is not only used as a grinding adjuvant, but furthermore as a spacer between the separate insulating material particles.

As a particulate insulating material, it is possible to make use of powder or fiber particles or mixes thereof. In this respect, it may be a question of agglomerates of finely distributed particles with a grain size under 0.1 micron, which have a pipe-like or pored structure. Such insulating materials are, for example, quartz and glass fibers, aluminum silicate fibers and further ceramic fibers, powder-form aluminum or mixes made up of fly-ash with expanded diatomaceous earth, fine-grain aluminum or chromium oxide and aerogels, as for example of silica, chromium oxide, thorium oxide, magnesium hydrate, aluminum oxide or mixes thereof. These aerogels may, in the present invention, not only be used as insulating material, but furthermore as dispersant, insofar as they are hydrophobized.

A further example of such insulating materials is pyrogenic silica, produced by the chemical decomposition of silicone tetrachloride. The size of these grains or particles will be in a range of 10 A to 2 mm and, more specially, under 1 micron. Generally, the heat insulating body will be made up of 95% of this insulating material, the more specially used range being 30 to 85% of insulating material.

For increasing the thermal or heat reflexion property, it is furthermore possible to have the addition of an opacifier, in finely distributed form as well and normally with a grain size of 2 to 3 microns. Examples of such opacifiers which may be used are graphite and carbon black, if the temperature is not overly high, inorganic oxides of titanium (ilmenite), rutile, chromium oxide, manganese oxide, iron oxide and carbides of silicon, boron, tantalum or tungsten or mixes thereof. Furthermore, it is possible to make use of metallic aluminum, tungsten or silicon, zircon, titanium dioxide or lead monoxide and further materials having a high index of thermal reflexion or of IR-refraction. Such opacifiers may undergo addition up to a level of 60% of the weight of the thermal insulating body.

The mix ready for pressing may furthermore undergo the addition of reinforcing fibers as for example alumosilicate fibers or glass fibers, which normally have a diameter of about 5 to 10 microns and a length of some millimeters. Such reinforcing fibers may be put in up to a level of about 40% of the weight of the mix.

For producing the thermal insulating body of the present invention, firstly the first-stage mix, made up of the binder and the dispersant, is produced. 0.5 to 20 and, more specially, 5 to 10%, of dispersant and a representative amount of binder is used. This mix, having, for example, 10% by weight of hydrophobized silica and 90% of soda, is milled, for example in a vibratory disk mill down to a grain size under 1 micron and is then mixed with the specially designed mix of insulating material, opacifier and reinforcing fiber. In this respect, there will be a level of first-stage mix in the last-stage mix of 2 to 30 and, more specially, 10% by weight. Such a last-stage mix may, for example, be made up of about 60% of pyrogenic silica, 25% of ilmenite, 5% of Al-Si fiber and 10% of first-stage mix in the form of soda and hydrophobized silica.

After mixing in a mixing apparatus, producing an even distribution of the components, the mix is pressed into boards in a press or into other moldings and then undergoes heat processing. In this respect, the particle-like or particulate material is acted upon by a mechanical force, the pressure level lying generally between 0.07 and 21 kg per square centimeter, or even higher, a parting material being best used between the press parts and the insulating material.

The board or other body produced on these lines now undergoes heat processing in a stove or oven or using high frequency (microwave) heating.

In the heating stove, the temperature is not to be greater than 700° C., because, on getting higher than this temperature, sintering of the insulating particles will be started. Generally, the process is undertaken in a temperature range between 500° and 600° C., in which the glass-forming materials, for example the soda, are melted with the particle-like insulating material, for example pyrogenic silica, so that a silicate is formed and the separate edges and corners of the insulating material are joined together forming a three-dimensional lattice. It has turned out that, in the case of using a temperature of 600° C., a process time of 20 minutes in the stove or kiln is long enough for a board which is 20 mm thick. In this respect, a board material is produced which may readily worked and is abrasion-resistant. If boards with a thickness of 40 mm are to be heat-processed, the process time has to be increased, for example to 30 minutes.

On the other hand, the temperature in the stove will have an upper limit of 300° C. if organic polymers are used for crosslinking the board. Such polymers undergo decomposition at temperatures greater than 200° to 300° C. so that they become useless. Such a polymer may be used if the insulating boards are not to be used later at temperatures greater than 200° C.

On the other hand, the lattice structure may be produced by using substances with a high absorption in the microwave range, selection being made of substances with a high loss angle in this respect. For this purpose, water-containing compounds as for example water glass or phenolic resins may be more specially used because of their properties. The binders, distributed in the insulating material, of the water glass or phenolic resin type are selectively heated to temperatures of 1000° C. and more in a high frequency or microwave apparatus, the insulating particles being joined together at these binder particles. In this respect, the effect is the same if the binder particle itself undergoes reaction with the forming of a chain (water glass) or is destroyed (phenolic resin), something amounting to catalytic curing. It is to be noted in this respect that, for example, mineral fiber particles, containing phenolic resin, may be decreased in size in a ball mill down to some microns and then mixed in into the mix as a binder. Because such fibers may have up to 15% of phenolic resin, a representatively smaller amount of binder may be mixed in. In certain cases, the amount of phenolic resin, sticking to the mineral fiber particles, may even be enough to make certain of the desired level of compacting of the thermal insulating body.

In a further, preferred example of the invention, silicone resins, more specially methylsilicone resins, are used which undergo decomposition at a temperature of 500° to 600° C., a $SiO_2$ bridge being formed; a three-dimensional lattice being formed in this case joined to the nearby insulating material particles. It is furthermore to be kept in mind that low-melting point glass-forming substances will be present, after heat processing, as bridging bodies between the insulating material particles, while organic polymers, like the formaldehyde resins used earlier in a cured condition, will be burned out on high temperature processing in a microwave oven and, for this reason, only have the function of starting a catalytic, cross-linking reaction.

LIST OF FIGURES

In the figures, working examples of the thermal insulating body of the present invention will be seen.

DETAILED ACCOUNT OF WORKING EXAMPLES OF THE INVENTION

Figure 1:
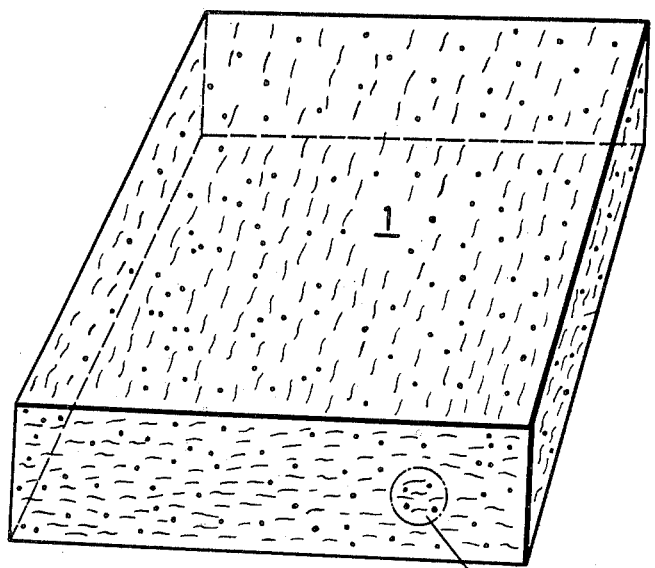
FIG. 1 is a view of a one-layer insulating board, the three-dimensional lattice structure being seen as a part given on a greater scale.

In FIG. 1 the insulating board is numbered 1, which has taken on the form to be seen after pressing and heating. The board or plate is made up of fine-grain insulating material, opacifier, mineral fiber wool and binder.

In the part to be seen in FIG. 1 on a greater scale, for reasons of making the figure more straightforward, only the insulating material particles 2 and the binder particles 3 (in the from of dots) will be seen. The reader will be able to see from this part on a greater scale that the binder particles 3 are nettedly joined up with the insulating material particles 2, crossing over each other, in all directions in space, this forming a strong framework inside the material.

Figure 2:
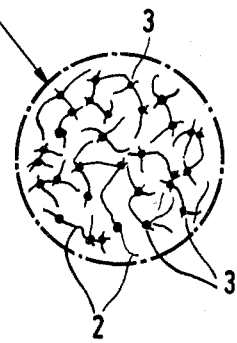
FIG. 2 is a view of a three-layer insulating board.
Figure 2:
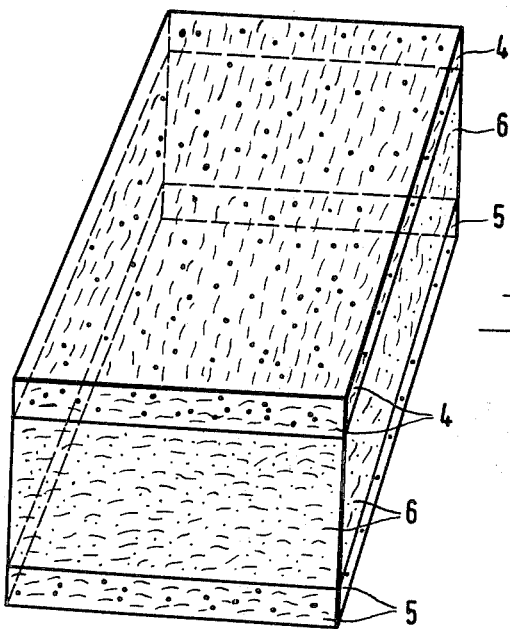

As will be seen from the further example of the invention to be seen in FIG. 2, the thermal insulating body is made up of three layers, that is to say the covering or outside layers 4 and 5, compounded with a binder, and the core or inner layer 6, which is free of binder. The composition of the covering layers and the core layer is, for this reason, the same but for the addition of the binder. Such an insulating board or plate is produced by firstly placing a layer of material with binder in a pressing mold, then a layer of material without binder is placed in the press and, lastly, a layer of material with binder is put on, whereupon the press is shut and put into operation. Nextly, curing is undertaken by heat processing. The inner layer has the same properties as a normal, insulating board, produced without binder, but, however, because of the presence of the two covering layers, is very much stronger and more resistant to abrasion.

Such a three-up or three-layer insulating plate is more specially able to be used when high temperatures come into question, if the covering layers 4 and 5 are enriched with materials which are highly resistant to heat, such as aluminum oxide or zirconium oxide so that a temperature gradient is produced stretching from the outer side of the covering layer to the core layer in such a way that the core layer is not damaged even when the structure is acted upon by high temperatures. On the other hand, all the three layers may have binder, the covering layers 4 and 5 then being able, however, to be compounded so as to be in line with the fields of use in view. For example it is possible to make use as fillers for the covering layer of aluminum oxide, sand, milled fireclay, kaolin and perlite may be used. It is furthermore possible to make use of fibers such as asbestos, mineral wool or, more specially, aluminum silicate fibers. These covering layers may be colored with pigments which may be safely used at temperatures under 900° C. without being chemically broken down. Furthermore the opacifiers noted may be used.

I claim:

1. A process for making a thermal insulating body, comprising, forming a first admixture of a binder and a dispersant, wherein the dispersant is present in an amount of 0.5 to 20% by weight of the binder and wherein the particle size of the binder is generally 1 micron or less;

mixing the first admixture with a highly dispersed insulating material to form a second admixture; and then pressing and curing the second admixture, by application of heat, so that the edges and corners of the insulating material undergo cross-linking with the binder.

2. The process according to claim 1, wherein the binder is soda or sodium sulfate.

3. The processes according to claim 1, wherein the dispersant is hydrophobized silica, pyrogenic silica, polytetrafluoroethylene or mixtures thereof.

4. The process according to claim 1, wherein the dispersant is hydrophobized silica.

5. The process according to claim 3, wherein the dispersant is present in an amount of 5–10% by weight of the binder.

6. The process according to claim 1, further comprising adding to said second admixture an opacifier selected from the group consisting of graphite; carbon black; oxides of titanium; chromium oxide; manganese oxide; iron oxide; carbides of silicon; boron; tantalum; tungsten or mixtures thereof; aluminum; tungsten; silicon; zircon; and lead monoxide.

7. The process according to claim 1, wherein the particle sizes of the binder, the dispersant, the insulating material and the opacifier are all less than 1 micron.

8. The process according to claim 1, wherein ratio of binder to insulating material is within the range of 2:98 to 30:70.

9. The process according to claim 8, wherein the ratio of binder to insulating material is 10:90.

10. The process according to claim 1, wherein the curing is conducted by heating at a temperature of 500° to 700° C.

11. The process according to claim 1, wherein curing is conducted in a high frequency or microwave oven.

12. The process according to claim 1, further comprising the steps of dividing said second admixture into a first portion and a second portion;

forming a first layer of said first portion;

laying down upon said first layer, a second layer comprising insulating material;

laying down upon said second layer, a third layer formed from said second portion; and then pressing and curing the so-formed three layer composite.

13. The process according to claim 1, wherein the insulating material comprises mineral fibers containing a cured binder.

* * * * *